Nov. 29, 1949　　　　E. A. GLYNN　　　　2,489,486
CONTROL MECHANISM FOR TIRE MOLDS
Filed July 13, 1948　　　　　　　　　　　4 Sheets-Sheet 3

INVENTOR
E. A. Glynn
BY
ATTORNEYS

Nov. 29, 1949 E. A. GLYNN 2,489,486
CONTROL MECHANISM FOR TIRE MOLDS
Filed July 13. 1948 4 Sheets-Sheet 4

INVENTOR.
E. A. Glynn
BY
ATTYS

Patented Nov. 29, 1949

2,489,486

UNITED STATES PATENT OFFICE 2,489,486

CONTROL MECHANISM FOR TIRE MOLDS

Edwin A. Glynn, Lodi, Calif., assignor to Super Mold Corporation, Lodi, Calif., a corporation of California Application July 13, 1948, Serial No. 38,471

4 Claims. (Cl. 18—18)

This invention relates in general to tire vulcanizing molds, the invention being particularly adapted, but not limited, for use in connection with molds used to apply new treads to used tires in the process known as recapping.

The present invention is directed to, and it is an object to provide, novel control mechanism for a heavy-duty vertical axis type, tire recapping mold which includes a lower annular section and an upper annular section; one part of said mechanism being operative to break the upper section away from the lower section after vulcanization, the vulcanized tire in the mold, the vulcanized tire tending to stick or hold the mold sections against easy separation.

Another object of the invention is to provide a control mechanism for tire molds, as above, wherein the part of said mechanism which is employed to break the upper section away from the lower section includes generally vertically extensible, transverse axis hinged and an upstanding fluid pressure actuated power cylinder connected between the sections adjacent said hinges.

An additional object of the invention is to provide a control mechanism for tire molds, of the type described, wherein another part of said mechanism is operative to lift the hingedly mounted, heavy upper section to an open position after said section is broken away from the lower section as aforesaid.

A further object of the invention is to provide a control mechanism, as in the preceding paragraph, wherein said other part of the mechanism includes a mast upstanding from the mold and supporting a horizontal monorail on which a winch unit travels; said winch unit including a cable depending therefrom for lifting engagement with the upper section of said mold.

A further object of the invention is to provide a practical and reliable control mechanism for tire molds, and one which will be exceedingly effective for the purpose for which it is designed.

These objects are accomplished by means of such structure and relative arrangement of parts as will fully appear by a perusal of the following specification and claims.

Figure 1:
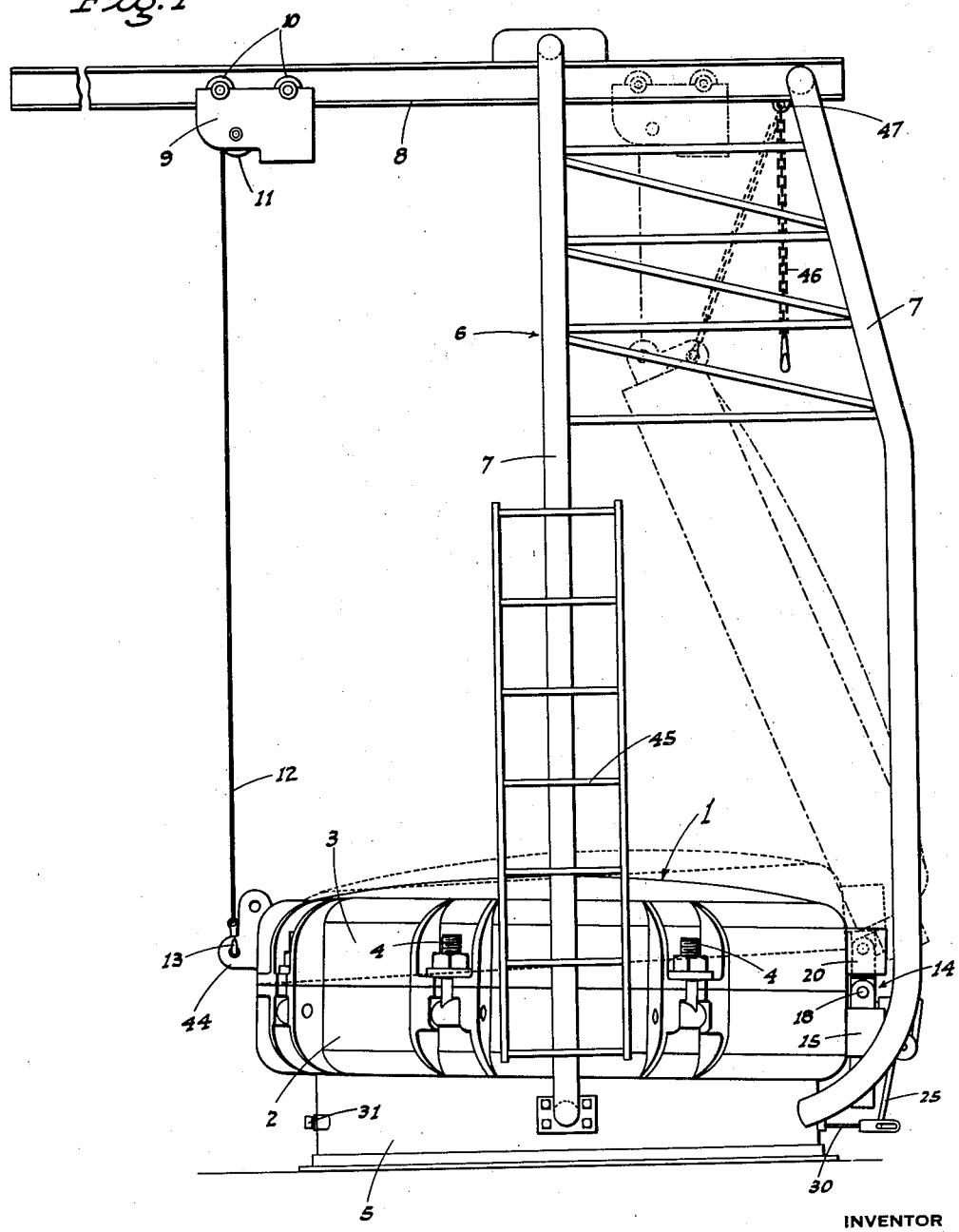
Fig. 1 is a side elevation of a heavy-duty, tire recapping mold fitted with the novel control mechanism.
Figure 2:
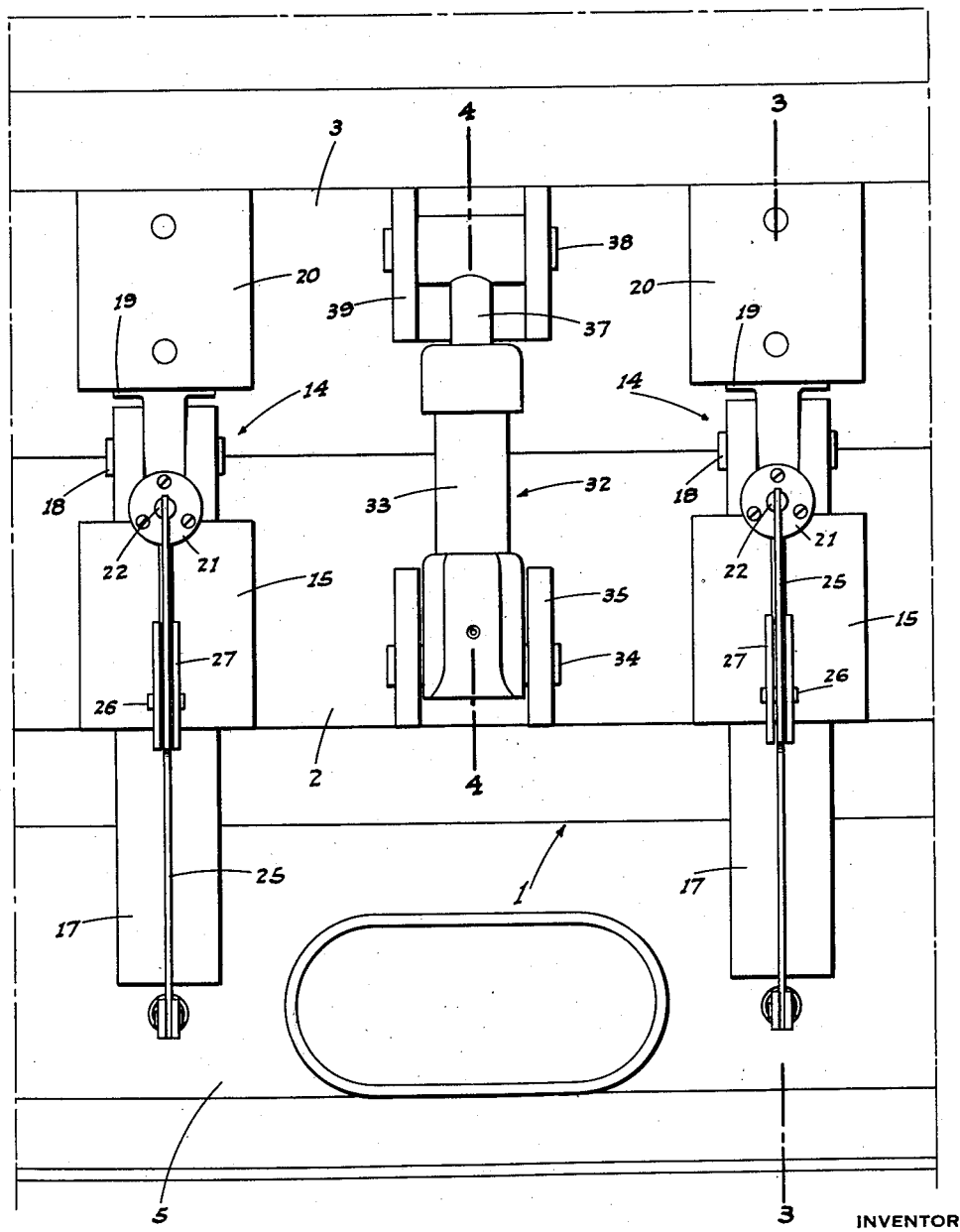
Fig. 2 is a fragmentary elevation of the back of the mold showing the hinge and power cylinder assembly.

Referring now more particularly to the characters of reference on the drawings, the control mechanism is here shown as mounted in connection with a heavy-duty, vertical-axis tire recapping mold, indicated generally at 1, of the type employed to vulcanize new treads on truck or large industrial size tires; such mold 1 being annular and including a lower section 2 and an upper section 3.

The lower section 2 and upper section 3 are maintained in clamped-together relationship, when the mold is in use, by releasable tie bolts 4 extending therebetween.

The mold 1 is fixed in connection with, and supported by, an upstanding annular base 5 seated on the floor.

A tire mold of the above description is generally conventional, and to this mold the following novel control mechanism is applied:

A mast, indicated generally at 6, upstands from the back half of the base 1 and comprises spaced posts 7; said mast 6 supporting, at its upper end and directly over the mold 1, a horizontal monorail 8. The mono-rail 8 is of a length such that it projects at its forward or free end some distance beyond the vertical position of the mold 1, as clearly shown in Fig. 1.

A winch unit 9, preferably of electrically actuated type, runs on the mono-rail 8 by means including rollers 10. The winch unit 9 includes a cable drum 11 from which a flexible cable 12 depends; there being a hook 13 on the lower end of the cable.

At the back thereof the mold is fitted with a pair of vertically extensible, transverse-axis hinge units, each indicated generally at 14; said hinge units 14 being in adjacent but spaced relation, and as they are identical a description of one will suffice for both.

A boss 15, integral with the lower section 2, is formed with a vertical bore 16 in which a lower hinge part in the form of a cylindrical plunger 17 is slidably disposed; the upper end of said cylindrical plunger 17 being transversely pivoted, as at 18, to the exposed lower end of an upper hinge part 19 secured in the vertical bore 19a of a boss 20 on the upper section 3.

A guideway 21 projects rearwardly from the boss 15 at the top of the latter, and a latch bar 22 is slidably disposed in the guideway 1, being spring-pressed in the direction of the plunger 17 by means of a spring 23.

Figure 3:
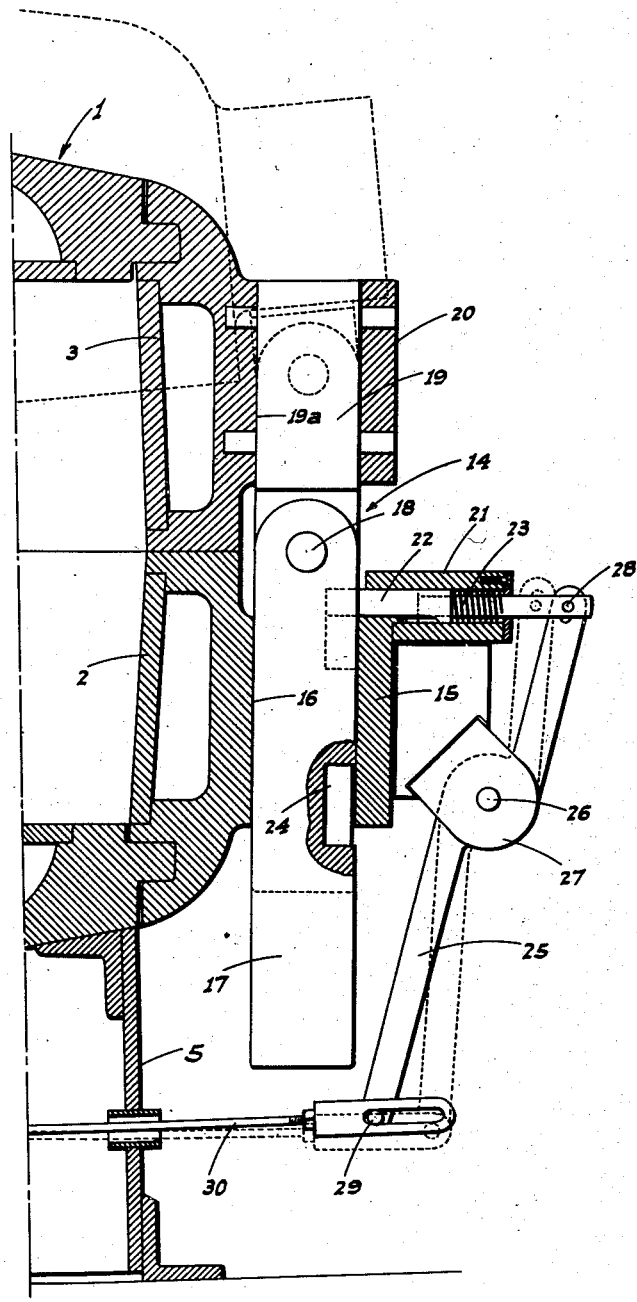
Fig. 3 is a fragmentary radial section on line 3—3 of Fig. 2, showing one of the hinge units.
Figure 4:
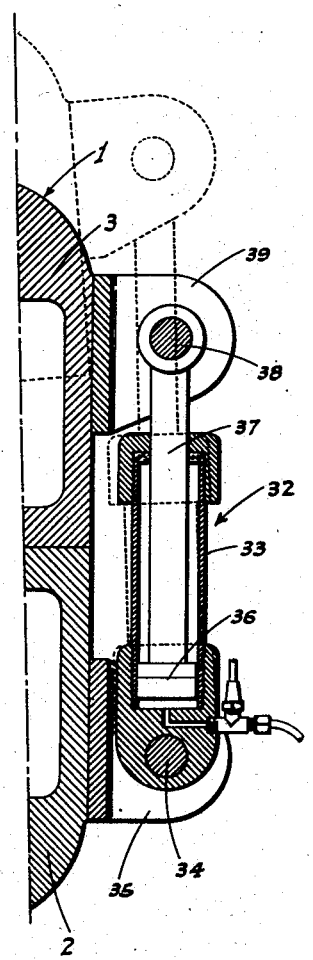
Fig. 4 is a fragmentary radial section on line 4—4 of Fig. 2 showing the power cylinder unit.
Figure 5:
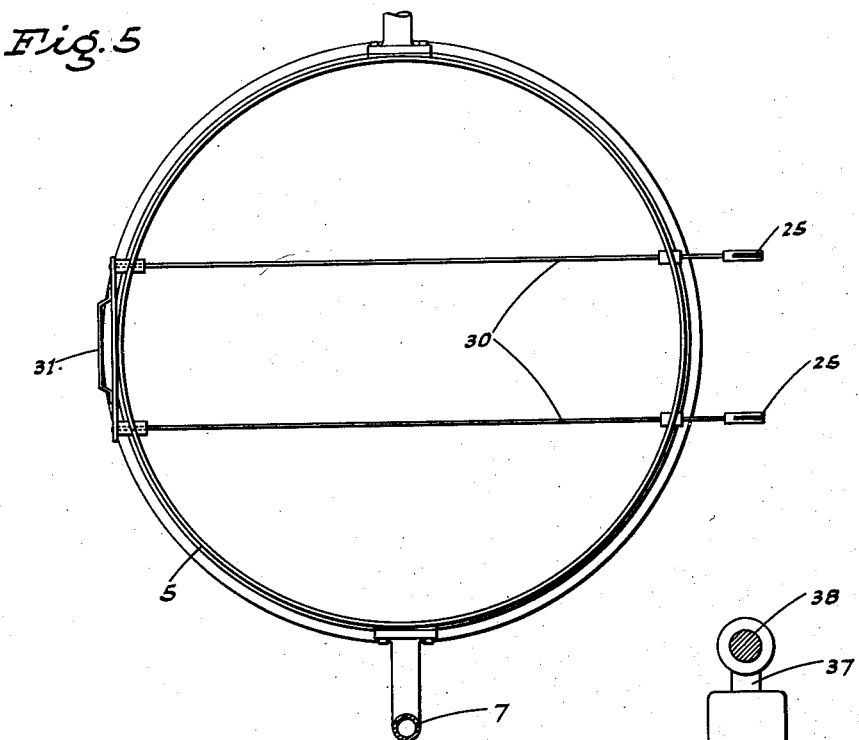
Fig. 5 is a plan view of the base of the mold, with the latter removed.

The latch bar 22 is normally in retracted position, as in full lines in Fig. 3, and rides against the adjacent face of the plunger 17. However, upon predetermined upward sliding movement of the plunger 17 in the vertical bore 16, the latch bar 22 registers with, and snaps into, a receiving socket 24 in said plunger, whereby to automatically releasably latch the same in a predetermined elevated position.

The following releasing device is arranged in connection with the latch bar 22:

A generally upstanding swing lever 25 is pivoted, intermediate its ends, as at 26, to an ear 27 which projects rearwardly from the boss 15. The upper end of the swing lever 25 is pivoted in vertical lost motion relation to the outer end of the latch bar 22, as at 28, whereas the lower end of said swing lever 25 is pivoted in horizontally lost-motion relation, as at 29, to the rear end of a forwardly extending pull rod 30. The pull rod 30 extends forwardly through the base 5 to a point to the front thereof.

A cross handle 31 connects the forward and exposed ends of both pull rods so that the same may be simultaneously actuated by said handle.

Intermediate the vertically extensible, transverse-axis hinge units 14, the mold 1 is fitted with a hydraulic pressure actuated power cylinder unit, indicated generally at 32. Such power cylinder unit 32 includes an upstanding cylinder 33 transversely pivotally connected, at its lower end, as at 34, between ears 35 on the lower section 2. A piston 36 is reciprocable in the cylinder 33 and a piston rod 37 extends from the piston 36 upwardly and out of the cylinder to pivotal connection at the upper end of said rod, as at 38, between a pair of ears 39 on the upper section 2.

Figure 6:
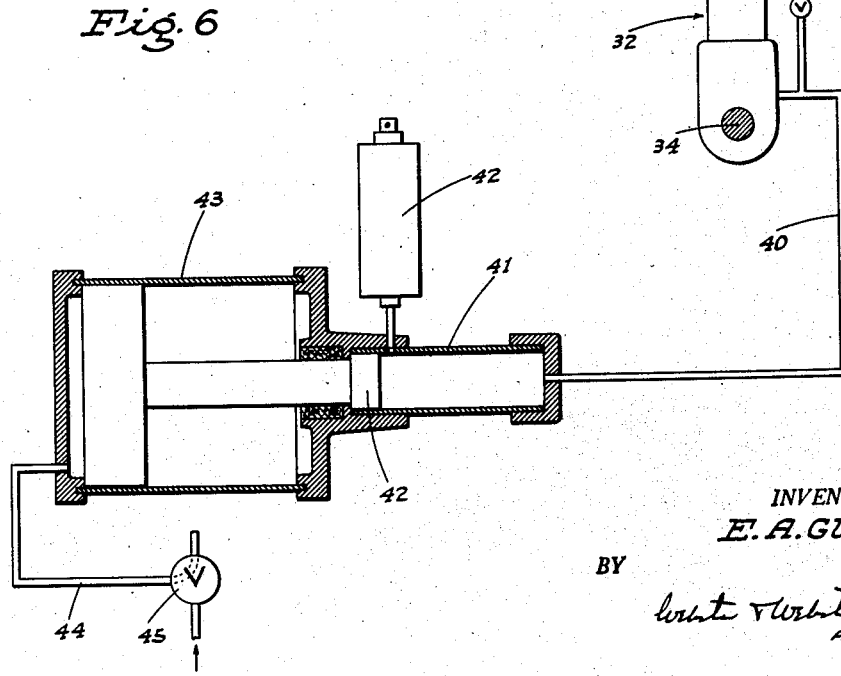
Fig. 6 is a diagram of the hydraulic-pneumatic fluid pressure system used in connection with the power cylinder.

The hydraulic pressure-actuated power cylinder unit 32 is controlled by the hydraulic-pneumatic fluid pressure system shown diagrammatically in Fig. 6, wherein:

A feed conduit 40 is connected in communication at one end with the lower end of the cylinder 33, while the other end of said conduit couples to a pressure cylinder 41; there being a reservoir 42 adapted to maintain the above described hydraulic portion of the system filled with a hydraulic fluid.

The piston 42 of the pressure cylinder 41 is normally retracted, but is adapted to be forcefully advanced by a piston-type air motor 43 of relatively enlarged diameter. The air motor 43 is actuated by means of an air pressure supply system pipe 44 having a two-way valve 45 interposed therein; said valve in one position feeding air pressure to the motor 43, and in another position venting the latter.

With the above arrangement operation of the air motor 43 advances the piston 42, creating a relatively high hydraulic pressure in the conduit 40 and the cylinder 33, whereby to cause advance or raising of the piston rod 37 of the power cylinder unit 32.

The described hydraulic-pneumatic fluid pressure system is advantageous for the reason that hydraulic pressure is preferred for the operation of the power cylinder unit 32, whereas the motor 43 is preferably an air actuated device for the reason that tire shops conveniently have air pressure available.

The above described control mechanism for a tire mold is used in the following manner:

After a tire is vulcanized in the mold 1, with the same closed, i. e. with the lower section 3 in engagement and secured together by the tie bolts 4, the latter are released. Thereafter the hydraulic-pneumatic fluid pressure system of Fig. 6 is brought into play to cause forceful extension of the power cylinder unit 32, which results in the back of the upper section 3 being forced upwardly from the corresponding portion of the lower section 2, to the position shown in dotted lines in Fig. 1. This breaks or loosens the upper section 3 preparatory to swinging to its open position.

In heavy-duty tire molds of the type described, power means is essential to relatively break the mold sections apart, as the tire vulcanized therein tends to stick or hold said sections together.

When the power cylinder 32 is extended, as above described, the plungers 17 of the vertically extensible hinge units 14 rise in the bores 16 until the latches 22 snap into the sockets 24, whereby to maintain said plungers 17 in elevated position, i. e. with the hinge units 14 extended in a manner to hold the upper section 3 in its dotted line position of Fig. 1.

The next step is the opening of said hinged upper section 3 to the broken-line position of Fig. 1, and this is accomplished as follows:

The winch unit 9 is disposed generally above the front of the mold 1, and the hook 13 of the cable 12 is engaged in an eye 44 on the front of said upper section 3. Thereafter, upon actuation of the winch unit 9 in a direction to pull upwardly on the cable 12, the upper section 3 is swung open; the winch unit 9 traveling rearwardly on the mono-rail 8 until it reaches its broken-line position of Fig. 1. To relieve the winch unit 9 of the mold, the operator ascends a ladder 45 on one of the posts 7 and connects a chain 46 with the upper section 3 at the front; said chain being permanently anchored, as at 47, to the mono-rail. When the upper section 3 is then chained in its open position, the hook 13 can be released from the eye 44, for use of the winch unit 9 to lift the tire from the open mold 1, and to place the next tire therein.

When such next tire has been placed in the lower section 2 of the open mold, the winch unit 9 is used to lower the upper section 3 to closed position; the pressure on the power cylinder unit 32 being released so that said upper section 3 may fully close of its own weight after the latch bars 22 are retracted by simultaneous pulling on the rods 30 by manipulation of the cross handle 31.

The above described control mechanism provides for the convenient and ready manipulation of the heavy and otherwise difficult-to-handle upper section 3 of the tire mold 1. The mechanism assures of positive breaking or loosening of the upper section 3 after vulcanization of a tire in the mold, and then holds said upper section 3 in broken-apart relation, with respect to the lower section 2, until said upper section 3 is swung to open position.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. Control mechanism, for a vertical axis tire mold including an annular, stationary lower section and an annular, movable upper section, comprising a pair of adjacent but circumferentially spaced hinge units connected between the sections, said hinge units having alined, transverse axes and being vertically extensible, and a vertically extensible power unit connected between the sections intermediate the hinge units and in raising relation to the upper section, releasable latch means adapted to maintain the hinge units extended, and another power unit operative to swing the upper section about the hinge axes to an open position; said hinge units each including a vertical plunger slidably disposed in a bored member on the stationary lower section, and a fixed member on the upper section pivoted to the upper end of the plunger; said latch means including a retractable, spring pressed latch bar slidably mounted on the lower section and normally urged into engagement with the plunger, the latter having a socket into which the bar automatically engages upon extension of the hinge unit and sliding motion of said plunger in a corresponding direction.

2. A control mechanism, as in claim 1, in which the hinge units are at the back of the mold, pull rods connected in releasable relation to the latch bars extending to the front of the mold, and a common pull handle connecting the rods at the front of the mold.

3. A vertical axis tire mold comprising a floor supported base, an annular lower mold section mounted in stationary relation on the base, an annular upper mold section cooperating with the lower section in movable relation, a vertically extensible hinge unit at the back of the mold between the sections, a vertically extensible power unit connected between the sections in raising relation to the upper section adjacent the hinge unit, a mast unit upstanding above the mold from the base, a horizontal monorail mounted on the mast above and extending forwardly of the mold, and a cable winch unit mounted on the monorail for travel therealong, said winch unit including a dependent cable adapted to connect to the upper section to swing it about the hinge axis upward to open position.

4. A vertical axis tire mold comprising a floor supported base, an annular lower mold section mounted in stationary relation on the base, an annular upper mold section cooperating with the lower section in movable relation, a vertically extensible hinge unit at the back of the mold between the sections, a vertically extensible power unit connected between the sections in raising relation to the upper section adjacent the hinge unit, a mast unit upstanding above the mold from the base, a horizontal monorail mounted on the mast above and extending forwardly of the mold, and a cable winch mounted on the monorail for travel therealong said winch unit including a dependent cable adapted to connect to the upper section to swing it about the hinge axis upward to open position; there being a flexible retention member adapted to connect between the mast and open upper section to then permit of disconnection of the cable therefrom.

EDWIN A. GLYNN.

REFERENCES CITED

The following references are of record in the file of this patent:

UNITED STATES PATENTS

| Number | Name | Date |
|---|---|---|
| 1,353,042 | Harris | Sept. 14, 1920 |
| 2,147,339 | Glynn | Feb. 14, 1939 |
| 2,174,590 | Meier | Oct. 3, 1939 |
| 2,255,770 | Glynn | Sept. 16, 1941 |
| 2,315,770 | Cleveland | Apr. 6, 1943 |
| 2,318,310 | Heintz | May 4, 1943 |